May 27, 1952 — A. R. CHASAR — 2,598,109

NIPPLE CHUCK

Filed Dec. 27, 1949

INVENTOR.
Anthony R. Chasar
BY Evans & McCoy

Patented May 27, 1952

2,598,109

UNITED STATES PATENT OFFICE 2,598,109

NIPPLE CHUCK

Anthony R. Chasar, Cleveland, Ohio, assignor to The Oster Manufacturing Company, Cleveland, Ohio, a corporation of Ohio Application December 27, 1949, Serial No. 135,161

6 Claims. (Cl. 279—7)

This invention relates to chucks for use on stationary or rotating spindles which have a screw socket to receive a screw threaded workpiece such as a nipple and to hold the same against movement by torsional thrusts exerted thereon during a machining operation.

The invention has for an object to provide a nipple chuck of simple and inexpensive construction which permits a nipple which has been subjected to a torsional thrust in a direction to tighten it in a chuck to be quickly and easily detached from the chuck.

A further object of the invention is to provide a chuck in which the nipple is securely clamped and quickly and easily released by means of a hand operated sleeve of small diameter.

With the above and other objects in view, the invention may be said to comprise the chuck as illustrated in the accompanying drawings and hereinafter described, together with such variations and modifications thereof as will be apparent to one skilled in the art to which the invention pertains.

Reference should be had to the accompanying drawings forming a part of this specification, in which.

Figure 1:
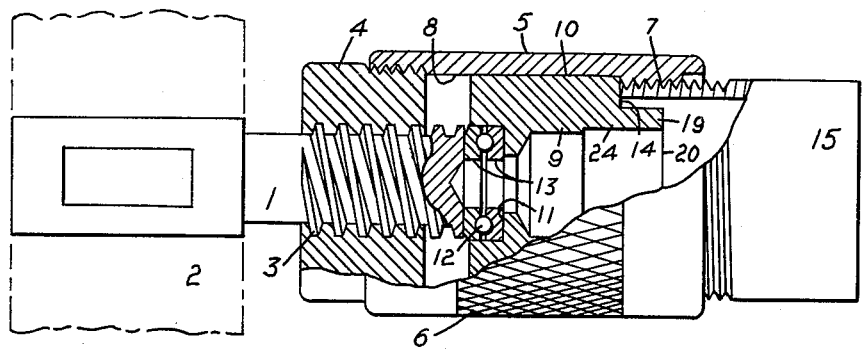
Figure 1 is a view partly in side elevation and partly in longitudinal section showing a chuck embodying the invention.
Figure 2:
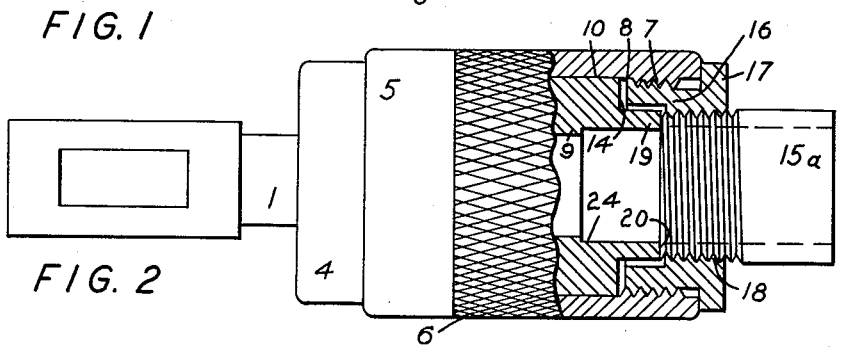
Fig. 2 is a view similar to Fig. 1 showing the same chuck with an adapter to accommodate a nipple of smaller diameter.
Figure 3:
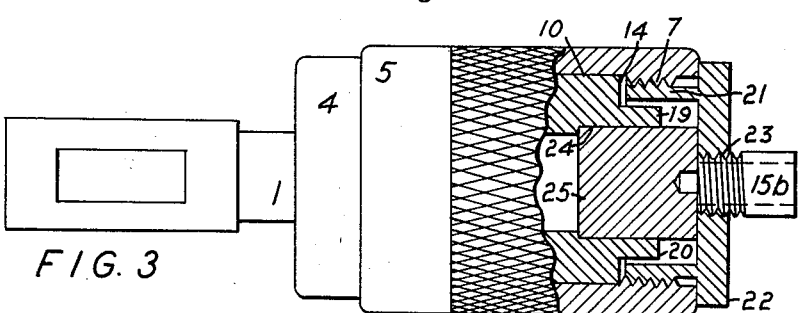
Fig. 3 is a view similar to Fig. 1 showing the same chuck with an adapter for a nipple smaller than that shown in Fig. 2.

In Figs. 1, 2 and 3 of the drawings the invention is shown applied to a spindle 1 that is mounted in a suitable support 2 and which may be rotatably mounted and power driven or held against turning movement in the support. When the workpiece is a pipe nipple a stationary spindle is employed with rotating threading dies and a driven spindle is employed with stationary threading dies.

As shown in Figs. 1, 2 and 3, the spindle is provided with a threaded end 3, and upon the threaded end 3 there is mounted a nut 4 that is rigidly attached to the small end of a cylindrical sleeve 5 that is preferably provided with a knurled external face 6 to facilitate turning of the sleeve by hand, the projecting portion of the sleeve 5 being provided adjacent the outer end thereof with an internally threaded portion 7. Inwardly of the threaded portion 7 the sleeve 5 is provided with an internally cylindrical portion 8 of a diameter greater than the threaded portion.

A thrust member 9 is mounted within the projecting end portion of the sleeve 5, the member 9 having a sliding fit in the portion 8 of the sleeve and having an enlarged inner end portion 10 that is shorter than the portion 8 of the sleeve so that the member 9 can move axially within the sleeve. The thrust member 9 can be inserted into or removed from the sleeve 5 through the inner end of the sleeve when the nut 4 is removed. The inner end of the thrust member 9 is provided with a centrally disposed socket 11 in which is mounted an antifriction bearing such as the ball thrust bearing 12, having one of its opposed race rings 13 seated in the bottom of the socket and the other facing the end of the spindle 1. At the other end of the enlarged portion 10 the member 9 is provided with a flat shoulder 14 for engagement with the inner end of a nipple 15 screwed into the outer end portion 7 of the sleeve.

When the sleeve 5 is turned on the spindle 1 in a direction to move the sleeve 5 inwardly on the spindle 1 the thrust applying member 9 is advanced toward the outer end of the sleeve 5 and brought into engagement with the inner end of the nipple 15 screwed into the internally threaded end of the sleeve which provides an open ended nipple receiving socket. During the threading operation on the nipple 15, a torsional thrust is applied to the nipple in a direction tending to screw the nipple into the sleeve 5. The screw threads connecting the nipple 15 to the sleeve are of the same hand as the screw threads connecting the inner end of the sleeve 5 to the spindle 1, so that a torsional thrust exerted on the nipple 15 to screw the same into the sleeve 5 tends to turn the sleeve 5 in a direction to move the sleeve inwardly on the spindle 1 and to advance the thrust member 9 toward the nipple 15 so that the nipple 15 is locked against turning movement with respect to the sleeve 5, and against endwise movement with respect to the spindle 1 during the threading operation.

The screw threads connecting the inner end 5 of the sleeve to the spindle 1 preferably have a lead angle materially greater than the lead angle of the nipple socket thread 7. The ball thrust bearing 12 reduces frictional resistance to turning movement of the spindle 1 with respect to the thrust member 9 and the frictional resistance to turning movement of the nut 4 in a direction to relieve end thrust between the spindle 10 and the member 9 is slight because of the relatively high lead angle. Therefore, the sleeve 5 can be easily turned by hand in a direction to relieve the end thrust on the member 9, permitting the member 9 to move away from the nipple 15 to free the nipple so that it can be unscrewed by hand from its socket. As herein shown there is a multiple thread screw connection between the sleeve 4 and sleeve 1, the multiple thread comprising two or more parallel helically disposed threads which are disposed at a lead angle materially greater than the single thread 7 of the nipple socket.

In Fig. 2 of the drawings an adapter 16 is shown screwed into the outer end of the sleeve 5, the adapter 16 having a flange 17 that engages with the outer end of the sleeve to limit the movement of the adapter into the sleeve. The adapter 16 is provided with an open ended internally threaded nipple socket 18 into which a nipple 15a smaller than the nipple 15 may be screwed. The screw threads connecting the adapter 16 to the nipple 15a are of the same hand as the threads 7, and the inner end of the nipple 15a is engaged by a reduced extension 19 of the thrust member 9 which has an end face 20 that engages the end of the nipple 15a. The chuck with the adapter 16 functions in the same manner as when the nipple is screwed directly into the sleeve as shown in Fig. 1, the torsional thrust exerted on the nipple during the threading operation acting through the sleeve 5 to hold the adapter flange 17 against the end of the sleeve and to clamp the thrust member 9 against the end of the nipple 15a.

In Fig. 3 of the drawings an adapter 21 is shown screwed into the outer end of the sleeve 5, the adapter 21 having a flange 22 for engagement with the end of the sleeve to limit its inward movement. The adapter 21 is provided with a centrally disposed internally threaded open ended socket 23 to receive a small nipple 15b. The thrust member 9, which is of tubular form at its outer end, is provided with a counterbore 24 which provides clearance for a reaming tool when nipples such as 15 and 15a require reaming and which also provides a socket for a plug 25 which extends beyond the end face 20 and provides an abutment that engages with the inner end of a nipple 15b screwed into the socket 23. The screw thread connection between the nipple 15b and the adapter 21 is of the same hand as the screw thread connection between the adapter 21 and the sleeve 5 and the screw thread connection between the sleeve 5 and spindle 1, and a torsional thrust exerted on the nipple 15b during the threading operation presses the thrust member against the nipple in the same manner as in Fig. 1.

In Figs. 1, 2 and 3 which show the preferred form of the invention, a screw thread connection is provided between the sleeve 6 and the spindle 1. The screw serves as a helical cam for imparting an endwise movement to the sleeve when it is turned on the spindle. Since only a small turning movement is required, it is not essential that the helical cam extend entirely around the periphery of the spindle as shown in Figs. 1, 2 and 3.

Figure 4:
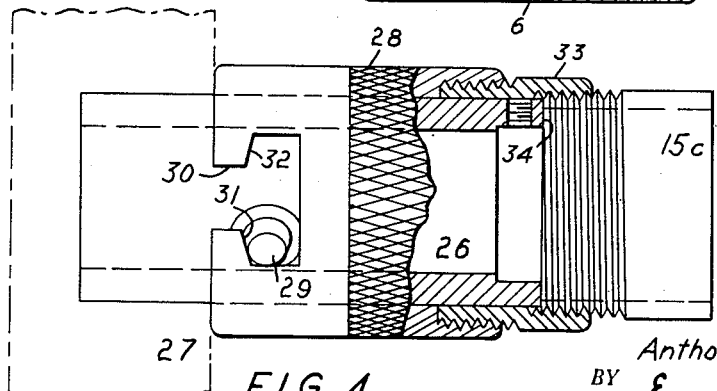
Fig. 4 is a view partly in side elevation and partly in longitudinal section showing a modified form of the chuck.

In Fig. 4 of the drawings, a modification is shown in which the sleeve and spindle are provided with interengaging members forming a helical cam of a relatively short circumferential extent. As shown in Fig. 4, a tubular spindle 26 is mounted in a suitable support 27 and has an externally knurled sleeve 28 rotatably mounted thereon.

The spindle 26 has a radially projecting pin 29 which is adapted to enter a slot 30 formed in the inner end of the sleeve 28 and to be received in lateral extensions of the slot 30 which are provided with oppositely disposed helical faces 31 and 32 of opposite angularity. The outer end of the sleeve 28 receives an adapter 33 which is internally threaded to provide a socket for a threaded nipple 15c. As shown in Fig. 4, the pin 29 is engaged with the helical cam face 31 which has the same directional inclination as the socket thread of the adapter 33, so that the torsional thrust exerted on the nipple 15c during the threading operation tends to turn the sleeve 28 in a direction to move the sleeve inwardly on the spindle and advance the spindle toward the nipple 15c.

For a nipple having a thread of the hand opposite that of the nipple 15c an adapter having a socket thread of the opposite hand is substituted for the adapter 33, and the sleeve 28 is turned to engage the pin 29 with a helical cam face 32.

In Figs. 1, 2 and 3 a chuck is shown which is designed to accommodate nipples of various sizes, and in order to provide means for applying thrust to the inner ends of small nipples as well as large nipples, a separate thrust member 9 is interposed between the spindle and the nipple socket. The thrust member 9 is in effect part of the spindle during the clamping operation, and when the chuck is adapted for a single size of nipple as shown in Fig. 4, the thrust applying means may be a shoulder formed directly on the spindle. As shown in Fig. 4, the spindle 26 has an end shoulder 34 that directly engages with the inner end of the nipple 15c.

It is to be understood that in accordance with the provisions of the patent statutes, variations and modifications of the specific devices herein shown and described may be made without departing from the spirit of the invention.

What I claim is:

1. A nipple chuck comprising a spindle, a sleeve mounted on the spindle and projecting beyond an end thereof, an open ended nipple receiving socket fixed to and movable with the sleeve and coaxial therewith, said socket being beyond the end of the spindle and having an internal screw thread, a thrust applying means movable with the spindle and engageable with the inner end of a nipple in said socket, and interengaging members on said spindle and sleeve forming a helical cam for moving the sleeve endwise on the spindle upon a turning movement of the sleeve on the spindle, the inclination of the helical cam and socket thread being directionally the same whereby a torsional thrust on a nipple screwed into said socket in a direction to move the nipple toward the spindle tends to turn the sleeve in a direction to move the same inwardly on the spindle and to advance the spindle toward the nipple to press said thrust applying means against the inner end of the nipple, the lead of the cam being materially greater than that of the socket thread, so that the sleeve may be readily turned by hand in a direction to relieve the pressure between the nipple and the thrust applying means.

2. A nipple chuck such as set forth in claim 1 in which the helical cam is a multiple thread screw.

3. A nipple chuck comprising a spindle having an externally screw threaded end portion, a sleeve having an internally screw threaded inner end portion receiving the threaded end of the spindle and an outer end portion projecting beyond the end of the spindle, said projecting portion of the sleeve having a nipple socket fixed thereto and coaxial therewith and provided with an internal screw thread of the same hand but of substantially less lead than the screw threaded inner end of the sleeve, an axially movable thrust member slidably and rotatably fitting in the sleeve independently of the spindle between the end of the spindle and said socket and having a face portion engageable with the end of a nipple in said socket, and an antifriction ball thrust bearing interposed between the thrust member and spindle.

4. A nipple chuck comprising a spindle having an externally screw threaded end portion, a sleeve having an internally screw threaded inner end portion receiving the threaded end of the spindle, an internally cylindrical end portion projecting beyond the end of the spindle and an internally screw threaded outer end portion, an adapter screwed into the outer end of said sleeve and having a shoulder engageable with the outer end of the sleeve, said adapter having an open ended nipple receiving socket having an internal thread of the same hand but of lesser lead than the screw threaded inner end of the sleeve, and an axially movable thrust member slidably and rotatably fitting in the internally cylindrical portion of the sleeve and interposed between the end of the spindle and said adapter and having a face portion engageable with the inner end of a nipple in said socket.

5. A nipple chuck such as set forth in claim 4 in which said thrust member has a stepped outer end face providing axially spaced concentric face portions for engagement with nipples of different sizes.

6. A nipple chuck comprising a spindle having an end portion in the form of a multiple thread screw, a sleeve having an inner end portion internally threaded to receive said multiple thread screw, said sleeve having an outer portion of greater internal diameter than its inner portion and projecting beyond the end of the spindle, the outer portion of said sleeve being internally threaded at its outer end and having an internally cylindrical portion inwardly of the screw threads of greater internal diameter than the internally threaded portion, an internally threaded adapter for a single thread nipple screwed into the outer end of said sleeve, and a spindle actuated member slidably and rotatably fitting in said cylindrical portion for applying end thrust to a nipple screwed into said adapter, said thrust applying member having an outer end portion of reduced diameter that projects into said adapter and is engageable with a nipple screwed into said adapter.

ANTHONY R. CHASAR.

REFERENCES CITED

The following references are of record in the file of this patent:

UNITED STATES PATENTS

| Number | Name | Date |
|---|---|---|
| 406,834 | Guthrie | July 9, 1889 |
| 500,746 | Reilly | July 3, 1893 |
| 513,147 | Riley | Jan. 23, 1894 |
| 523,722 | Hull | July 31, 1894 |
| 540,989 | Keyes | June 11, 1895 |
| 851,137 | Manley | Apr. 23, 1907 |